United States Patent

Arimura et al.

[11] 3,935,892
[45] Feb. 3, 1976

[54] PNEUMATIC TIRED WHEEL

[75] Inventors: Iwao Arimura, Kodaira; Yasuo Suzuki, Akigawa; Akira Matsuda; Akio Sato, both of Higashi-Murayama, all of Japan

[73] Assignee: Bridgestone Tire Company, Ltd., Tokyo, Japan

[22] Filed: June 19, 1974

[21] Appl. No.: 480,766

[30] Foreign Application Priority Data
June 21, 1973 Japan.................. 48-69144

[52] U.S. Cl.......... 152/330 RF; 152/341; 152/353 R
[51] Int. Cl.²...................... B60C 5/06; B60C 17/00
[58] Field of Search............152/330 RF, 331, 333, 152/337–339, 341, 342, 379, 380, 382, 383, 353, 354, 400

[56] References Cited
UNITED STATES PATENTS

| | | | |
|---|---|---|---|
| 2,169,041 | 8/1939 | Gammeter | 152/339 |
| 2,674,291 | 4/1954 | Campbell | 152/341 |
| 2,898,969 | 8/1959 | Pfeiffer | 152/341 |
| 2,900,005 | 8/1959 | Riggs | 152/341 |
| 2,917,096 | 12/1959 | Snyder | 152/341 |
| 3,421,535 | 1/1969 | Hawkes et al. | 152/341 X |
| 3,464,477 | 9/1969 | Verdier | 152/353 R |
| 3,486,547 | 12/1969 | Powers | 152/330 RF |

*Primary Examiner*—Robert B. Reeves
*Assistant Examiner*—Francis J. Bartuska
*Attorney, Agent, or Firm*—Sughrue, Rothwell, Mion, Zinn & Macpeak

[57] ABSTRACT

A pneumatic tired wheel having excellent highspeed performance after puncture comprises a tubeless tire, a bead stopper and a rim. The tubeless tire comprises a pair of elastic reinforcements having a Shore A hardness of at least 47, the bead stopper comprises an independent air-tight chamber and a crown portion with at least one inextensible reinforcing layer. The crown portion has an outer diameter determined in connection with the outer diameters of the flange of the rim and the tread portion of the tire.

19 Claims, 6 Drawing Figures

FIG_2

FIG_3

PNEUMATIC TIRED WHEEL

BACKGROUND OF THE INVENTION

1. Field of the Invention

The present invention relates to a pneumatic tired wheel, and more particularly to a pneumatic tire assembly comprising a tubeless tire, an elastic bead stopper having an independent air-tight chamber inscribed within the bead portions of the tire and a rim, and having excellent highspeed performance for use in four-wheel vehicles.

2. Description of the Prior Art

Hitherto, as a tire or tire assembly in consideration of safety on puncture or burst, there have been usually proposed a double-separation type tire wherein a tubular body having another independent air-tight chamber is enclosed in the tire so as to bear a load after the puncture of the tire, a tire with a safety device wherein a supporting member made of an elastomeric material is arranged in the air-tight chamber of the tire, and a tire having a relatively thin reinforcing layer in the side wall thereof.

The double-separation type tire and the tire with the safety device, however, have common drawbacks that these tires are not suitable as a high speed running tire owing to the fact that the weight is considerably increased and that the cost becomes expensive. Especially, the former tire involves a fear of a so-called "double puncture," while the latter tire involves a fear of secondary trouble due to friction heat based on the difference of circumferential length between the supporting member and the inner surface of the tire. Therefore, these tires have not yet been put to practical use. On the other hand, the tires having the reinforced layer in the side wall thereof provide a rigidity required for running on rough roads to the side wall of the tire and prevent damage resulting from external cracks, but do not ensure the safe running after the puncture.

Moreover, provision has been made of a tubular body arranged in the tire so as to inscribe the bead portions and constituting an air-tight means when the tubeless tire is assembled with the rim having bead seats parallel to a rotation axis of tire (a so-called flat base rim), but this tubular body does not act as a bead stopper after the puncture of the tire.

SUMMARY OF THE INVENTION

An object of the present invention is to provide an improved pneumatic tired wheel which ensures not only the same performance as that of the conventional tire in normal running but also excellent running performance after the puncture. For instance, when a passenger car provided with pneumatic tired wheels according to the present invention runs on an expressway at high speeds, even if puncture suddenly occurs and the internal pressure of the tire is rapidly released, the load can be born by the rigidity in the side portions of the tire without shifting the bead portions into the central concave part of the rim and the car can rapidly be moved to a safety place or repair shop while maintaining the high speed without giving unrest feeling to the driver.

A feature of the present invention is the provision of a pneumatic tired wheel having excellent high-speed performance, comprising a tubeless tire, an elastic bead stopper having an independent and annular air-tight chamber inscribed within the bead portions of the tire and a rim, said tubeless tire comprising a pair of side portions extending from said bead portions and a tread portion extending between said side portions and further comprising a pair of elastic reinforcements having a Shore A hardness of at least 47 and made integral with said side portions so as to reinforce a thin area from said bead portion to said tread portion, said elastic reinforcements having a thickness gradually decreasing toward the bead portions and toward the center of the tread portion and having a maximum thickness not more than 15 percent of the maximum width of the tire when it is subjected to the internal pressure, said bead stopper encircling said rim together with said bead portions while making contact with the inner surface of the bead portions and the rim and having a crown portion provided with at least one inextensible reinforcing layer substantially extending along the width of the tire up to the inner surface of the tire, the outer diameter of said crown portion being larger than the outer diameter of a flange of the rim but small enough to keep the crown portion of the bead stopper from contact with the inner surface of the tread portion during running under a punctured condition.

According to the present invention, the elastic reinforcement for the tire consists of rubber or a rubbery elastomeric material having a Shore A hardness of at least 47, preferably 63 to 94. The maximum thickness of the elastic reinforcement is not more than 15 percent, preferably 2 to 8 percent of the maximum width of the tire taken when it is subjected to the internal pressure. Each of the elastic reinforcements is adhered to the inner surface of the tire or sandwitched between carcass plies or between the carcass and the outer rubber layer. The end of the elastic reinforcements directed toward the bead portion is overlapped with one end directed toward the side portion of a stiffener made of hard rubber or of an additional cord reinforced layer of the bead portion, said overlap being effected directly or through an intermediate layer such as carcass ply and the like. On the other hand, the end of the elastic reinforcements directed toward the tread portion is preferably overlapped with at least either side end of the reinforcing layer provided for the breaker of the tire directly or through the reinforcing layer such as carcass ply and the like.

The elastic reinforcements are, of course, endless in the circumferential direction of the tire. In the cross section of the tire, each elastic reinforcement extends from the position of the maximum width of the tire to a position close to the bead portion and to that position which is substantially located over the tread edge portion toward the center of the tread portion. It is preferable to make the elastic reinforcements integral with each other at the center of the tread portion and to extend the other ends of the elastic reinforcements up to the bead portions, respectively.

Further, the elastic reinforcements may be used together with a cord reinforced layer consisting of organic fibers such as nylon fiber, rayon fiber, polyester fiber, aromatic polyamide fiber and the like or metal wires, glass fibers or a canvas reinforced layer.

By such an arrangement, the inner periphery of the tread portion or the breaker is born at each opposite end of the elastic reinforcements, so that the separation of the central part of the tread portion from ground or the significant decrease of the pressure of ground contact is not only prevented by the rigidity of said reinforcements in a cross-sectional direction even after the puncture, but also the contact area increases as the reinforced shoulder portion of the tread portion comes into contact with ground, and consequently the cornering and stabilizing performance is not significantly lowered even if the inner pressure the tire is subjected to becomes zero.

The elastic reinforcement is preferably applied to radial tires having a rigidity which is made small from the shoulder portion to the side portion in view of the construction of the tire or applied to tires having a relatively round shoulder portion in view of the shape of the tire, that is, to round shoulder tires.

In order to improve the above described performance of the tire after the puncture, the bead portions of the tire are fixed firmly to the bead seats of the rim, because in the rim for four-wheel vehicles the bead seats are inclined with respect to the rotation axis of the tire toward the concave part in the central portion of the rim by an angle of about 5°. As a result, the tire may be easily removed from the rim when the inner pressure is released. Accordingly, it is necessary to provide a reliable means for fixing the bead portions of the tire to the rim.

As such a fixing means, provision is made of a bead stopper which when used with the tire having excellent high-speed performance must satisfy the following requirements.

1. High reliability in performance. If the tire is punctured, it is necessary to firmly fix the bead portions of the tire to the bead seats of the rim in order to prevent a socalled double puncture.
2. Light in weight. The heavy weight causes not only an increase of moment of inertia of the wheel but also an unbalance in moment of rotation. Further, it increases the unsprung weight of the vehicle so that such heavy weight is not preferable in view of vibrations.
3. Easy in detachability. The bead stopper should be enclosed in a given space, so that the detachment must be easy.
4. Less expensive. Among automobile parts, the tire and rim are expensive, so that a significant increase of the cost of these parts is not desirable.

Taking the above requirements into consideration, the inventors have made various experimental studies with respect to the bead stopper having an independent air-tight chamber. The experimental tests have yielded an improved construction in which the bead stopper made of rubber or a rubbery elastomeric material is joined in an annular form along the bead portions of the tire and has a crown portion having an approximately equal thickness in a cross-sectional direction and a reinforcing layer composed of at least one inextensible cord selected from the group consisting of organic fibers such as rayon fiber, polyester fiber, nylon fiber, vinylon fiber and aromatic polyamide fibers and metallic and glass cords and arranged in the crown portion facing the inner surface of the tread portion, and the outer diameter of the central part of the crown portion is made larger than the outer diameter of the flange of the rim in order to facilitate the detachment of the bead stopper from the rim, is made smaller than a half of the height in the cross-section of the tire when the tire is subjected to the internal pressure, and is so small that the crown portion of the bead stopper does not come into contact with the inner surface of the tread portion even when the tire is punctured during the running, thereby preventing the double puncture.

When the bead portions of the tire are firmly fixed to the bead seats of the rim through the above described bead stopper, the rigidity of the bead portions is distributed to the side walls of the tire when it is punctured, so that a better synergistic effect is obtained in association with the reinforcing effect of the tire.

Moreover, as the reinforcing layer, use may be, of course, made of various short-fiber blended rubber or a hard rubber unit.

BRIEF DESCRIPTION OF THE DRAWINGS

FIGS. 2 and 3 are cross-sectional views of examples of side reinforced tire to which the present invention is applicable, respectively;

DESCRIPTION OF THE PREFERRED EMBODIMENTS

Figure 1:
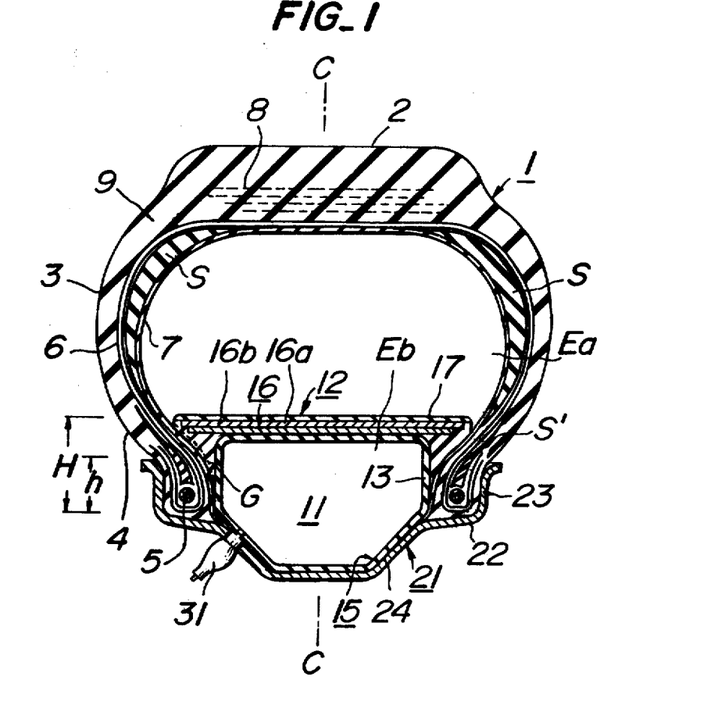
FIG. 1 is a cross-sectional view of an embodiment of the pneumatic tired wheel according to the present invention.

FIG. 1 shows a pneumatic tired wheel according to the present invention comprising a tubeless tire, a bead stopper and a rim, in which a pair of elastic reinforcements are adhered to the inner surface of the tire and the bead stopper is arranged in a space between the bead portions of the tire.

Referring to FIG. 1, reference numeral 1 designates a tubeless tire, 2 a tread portion, 3 side portions and 4 bead portions. A carcass 6 consists of two reinforced cord layers inclined with respect to a center line C—C of the tire by an angle of about 90° and is bent around a bead core 5 and outwardly turned up, and fixed at one end thereof in the bead portion 4.

A breaker 8 consists of four reinforced cord layers each serving as a belt means and inclined with respect to the center line C—C outside the carcass ply 6 by an angle of about 15° so as to strongly strengthen the tread portion 2.

The pair of elastic reinforcements S are symmetrically arranged in the inner surface of the tire 1 with respect to the center line C—C. The inside surface of the tire inclusive of the inner surfaces of the elastic reinforcements is covered with an inner liner 7. In this embodiment, the ends of the elastic reinforcements S near the tread portion are overlapped with the side ends of the breaker 8 through the carcass 6, while the ends of the reinforcements S near the bead portions are overlapped with ends of stiffeners S' each made of hard rubber near the side portions 3 through the carcass 6, respectively, whereby a relatively thinner portion of the side wall of the tire is strongly strengthened.

The tire 1 of such a construction is fitted into bead seats 22 of a rim 21 and a bead stopper 11 is arranged in a space formed between the bead portions 4 and closed by the rim 21. The bead stopper 11 consists of a rubber tube 15, which constitutes an air-tight chamber independent of the tire, and a reinforcing layer 16 composed of two rubber coated cord layers 16a and 16b and arranged circumferentially an and along the radially outer surface of the tube 15 wherein the two cord layers 16a and 16b cross each other at an angle of not more than 20° with respect to the circumferential direction of the bead stopper 11. Reference numeral 12 represents a crown portion consisting of the cord reinforced layer 16 and that wall portion of the tube 15 which makes contact with the inner surface of the layer 16. The substantially overall width of the crown portion 12 is covered with the cord reinforced layer 16. A space member 18 of hard rubber having a Shore A hardness of at least 55 is arranged in a space defined by the end of the layer 16, a side portion 13 of the tube 15 and the bead portion 4, whereby the rigidity of the outer area and side area in the circumferential direction of the bead stopper 11 is enhanced.

The bead stopper 11 is provided with a valve 31 common to both a space portion E$b$ of the bead stopper 11 and a space portion E$a$ of the tire and supplying internal pressures to these space portions. An air channel G communicating the space portion E$a$ with the valve 31 is formed in the outer surface of the side portion 13 by molding. As a result, the required internal pressure can be exactly established in both the space portions E$a$, E$b$ with the aid of a two way adapter (not shown) for the valve 31. When the tube 15 is subjected to the internal pressure, the pressure is exerted to the bead portions 4 of the tire and to a concave part 24 of the rim 21, so that even if the inner pressure of the tire becomes zero by the puncture, the bead portions 4 are not removed from the bead seats 22 to the concave part 24 of the rim and the load is born by the rigidity of the tire itself, whereby the vehicle can be run safely.

That is, if the air in the space portion Ea is released by the puncture, the side portion 3 becomes widened somewhat in the width direction of the tire owing to the fact that the load is supported by the rigidity of the side portion 3 thereof. But, the lower end of the space member 18 is superimposed through the bead portion 4 upon the upper end of a flange 23 of the rim 21 or approaches thereto. As a result, the side portions 13 of the tube 15 are caused to urge the bead portions 4 against the flanges 23 due to the internal pressure of the space portion E$b$, whereby the double puncture is prevented and the rim is made integral with the tire. Furthermore, as mentioned above, the lower end of the elastic reinforcement S overlaps the upper end of the stiffener S', so that the rigidity of the area near the bead portion 4 is effectively enhanced and consequently the reinforcing effect of the relatively small reinforcement can be unexpectedly increased. As a result, the load is born by the tire itself even after the puncture and the unexpectedly excellent running performance can be maintained as will be mentioned below.

FIG. 2 is a cross-sectional view of the tire to which the present invention is applicable.

In this embodiment, the elastic reinforcements S are arranged along all over the inner surface of the tire without using the inner liner 7 shown in FIG. 1. The elastic reinforcements S play the role of the inner liner 7.

The thickness of the reinforcements S is maximum at a relatively higher position of the side portion 3 and gradually decreases in directions toward the center line C—C and toward the bead portions 4, respectively, and as a result, the side portions 3 whose thickness is thinnest in the cross-section of the tire can be strengthened by the elastic reinforcement S.

The ends of the elastic reinforcements S near the tread portion 2 are joined together at the center line C—C of the tread portion 2, while the other ends thereof terminate at the top of the bead portions 4, respectively. It is a matter of course that the elastic reinforcements S are endless in the circumferential direction of the tire.

In the above arrangement, it is important that the thickness of the reinforcements S at the center line C—C must not be made thick. If the thickness is too thick, the weight of the portion concerned of the reinforcements S is increased and the central part of the tread portion 2 is pushed outwardly by a centrifugal force due to the rotation of the tire during its high-speed running. As a result, the width of ground contact of the tread portion is decreased and the pressure distribution of ground contact becomes ununiform and consequently the above described thickness is not favorable in view of the performance of the tire.

FIG. 3 shows another embodiment of the tire in which the elastic reinforcements S are extended from the vicinity of the end of the tread portion 2 to the vicinity of the upper part of the bead portions 4 and the inner liner 7 is adhered to the inner surface of the tire inclusive of the reinforcements. The elastic reinforcements S have a maximum thickness at a positions slightly near the bead portion 4 different from the tire shown in FIG. 2. The upper and lower ends of the reinforcements S overlap the ends of the tread portion 2 and the upper end of the stiffeners S', respectively, so that the thickness of the cross-section of the tire becomes approximately uniform from the tread portion 2 to the bead portions 4.

In the above, the fundamental examples of arranging the elastic reinforcements S in the inner surface of the tire have been described, but the reinforcements S may be arranged between the outer rubber layer 9 and the carcass 6 or in the inner portion of the carcass 6 (i.e. between plies of carcass in the tire having a plurality of carcass plies).

The above described arrangement may be applied to not only radial ply tires but also a so-called bias ply tires. However, a better result can be obtained by applying the said arrangement to radial ply tires whose rigidity of the side portion is smaller than that of the tread portion, and also is small if compared with that of the bias tires, and particularly to round shoulder tires having a roundshaped area from the tread portion to the shoulder portions.

Moreover, the following noteworthy points may be mentioned in the practice of the present invention.

1. The use of fiber or cord reinforced layer together with the elastic reinforcements does not interfere with the object of the present invention whatever is the manner of using them.
2. A plurality of elastic reinforcements may be arranged at the same or different position in the cross-section of the tire, but the total thickness of these reinforcements must be of a range not more than 15 percent of the maximum width of the tire when it is subjected to the internal pressure.
3. In tires having a large ratio of the height of the cross-section of the tire to the maximum width of the tire, that is, tires having a large aspect ratio, it is necessary to make the maximum thickness of the elastic reinforcements S larger within the above range because the rigidity of the side portion in the tire is relatively small. In this case, as the elastic reinforcements S, materials having an excellent thermal conductivity may preferably be used.

Figure 4:
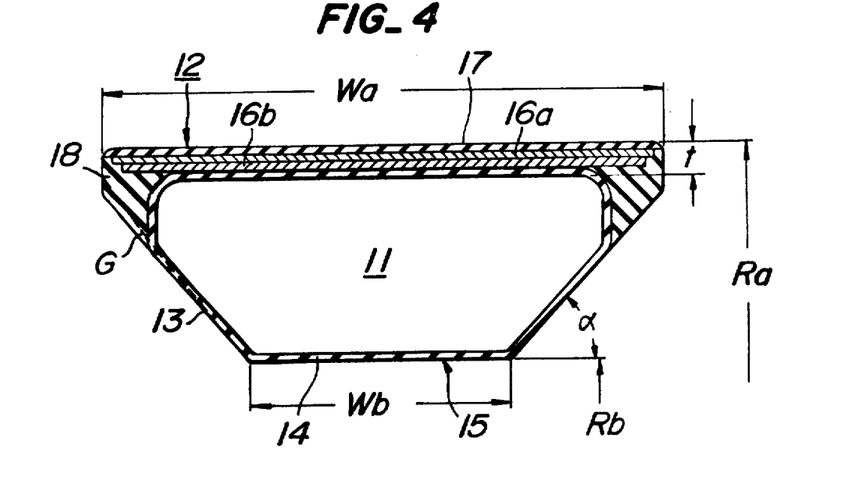
FIG. 4 is an enlarged cross-sectional view of the elastic bead stopper according to the present invention.

FIG. 4 is a schematic detail view of the bead stopper 11 shown in FIG. 1 before it is subjected to the internal pressure.

The bead stopper 11 has a trapezoidal cross-section defined by a crown portion 12, side portions 13 and a base portion 14 and consists mainly of a tube 15 having a relatively thin thickness and made of rubber or a rubbery elastomeric material. In the crown portion 12, cord reinforced layers 16a and 16b and further a rubber or rubbery elastomeric outer layer 17 are superimposed one upon the other on the outer surface of the tube 15 in the substantially overall width of the crown portion 12. Furthermore, a pair of space members 18 are provided on the areas connecting the crown portion 12 to the side portions 13 so as to strengthen these areas. The relationship of the bead stopper to the tire and the rim is selected in such a manner that the size of the bead stopper 11, before it is subjected to the internal pressure, is equal to or slightly smaller than the inner size of the tire after it is subjected to the internal pressure. If the size of the bead stopper 11 is larger than the inner size of the tire, the crown portion 12 is deformed or wrinkled when it is subjected to the internal pressure.

The cross-section of the crown portion 12 may preferably be made substantially flat or concave inwardly.

As the reinforcing layers 16a, 16b in the crown portion 12, cord materials may preferably be used and in this case these cord materials are arranged at an angle required for inhibiting the expansion of the crown portion 12 in the circumferential direction, preferably a smaller angle. In this embodiment, the cord reinforced layer 16a is inclined with respect to the circumferential direction by an angle of 0° and the cord reinforced layer 16b is inclined with respect to the circumferential direction by an angle of 90°. However, the cord reinforced layers 16a and 16b may be, of course, inclined symmetrically with respect to the circumferential direction by a given angle or only one reinforced layer may be inclined with respect to the circumferential direction by an angle of 0°.

The side portions 13 and the base portion 14 are necessary to expand to a certain degree due to the internal pressure, so that no addition of reinforcing material is preferable. However, fiber or cord reinforcing materials may be added, if necessary.

The height in the cross-section of the bead stopper 11 is determined depending upon the degree of deformation of the tire after the puncture. The inventors have examined scrap tires on what length of a nail tends to thrust into tires for automobile vehicles. The thus obtained results are shown in the following Table 1.

Table 1

| Length of nail (mm) | Number of nails | Ratio* (%) |
|---|---|---|
| <30 | 109 | 70.0 |
| 45 | 20 | 12.8 |
| 60 | 24 | 15.4 |
| 90 | 2 | 1.2 |
| <150 | 1 | 0.6 |
| Total | 156 | 100.0 |

* A ratio of number of nails thrust to total number of nails.

From Table 1, it can be seen that the above ratio increases as the length of the nail becomes small and is equal to 70 percent in case of nails each having a length of not more than 30 mm. Furthermore, the nail hardly thrusts into the tire at an angle perpendicular to the width direction of the tread portion and the longer nail has a strong tendency to thrust into the tire at a small angle to the ground, mostly at an angle not more than 45°. Therefore, it has been found that even when the tire is deformed by the puncture during the running, if the bead stopper does not come into contact with the inner surface of the tread portion, the nail hardly reaches the bead stopper 11. Especially, in order that the nail does not reach the bead stopper 11 under the above described circumstance, it is preferable that the distance from the outer surface of the tread portion to the bead stopper 11 is more than 30 mm.

If the height in cross-section of the bead stopper is too small and the outer diameter of the crown portion 12 in the central part is smaller than the outer diameter of the flanges 23, it is difficult to house the bead stopper in the rim for automobile vehicle as shown in FIG. 1.

The invention will now be described with reference to the practical use of pneumatic tired wheel comprising a tubeless tire, a bead stopper and a rim.

As the tubeless tire 1, there was used a common radial ply tire suitable for use in high-speed running at a size of 185/70 HR13 and having two-ply nylon carcass and four-ply rayon breaker.

The elastic reinforcements were made of a hard rubber having a Shore A hardness of 83 and were applied on the inner surface of the tire in such a manner that the maximum thickness of the reinforcements S is arranged at the position slightly higher than the position of the maximum width of the tire as shown in FIG. 2. The maximum thickness of the elastic reinforcements S was 5.4 percent (10 mm) of the maximum width (185 mm) of the tire when it is subjected to the internal pressure.

The bead stopper 11 had a shape and structure as shown in FIG. 4. In this embodiment, the width of the crown portion (Wa) was 120 mm, the width of the base portion (Wb) was 60 mm, the outer and inner diameters (Ra, Rb) were 400 mm and 310 mm, respectively and the angle $\alpha$ of the base portion 14 to the side portion 13 was 50°.

The tube 15 and the outer rubber layer 17 were made of rubber having a Shore A hardness of 45 and usually used as an inner liner for a tubeless tire, and had thicknesses of 2.0 mm and 1.0 mm, respectively. The cord reinforced layers 16a and 16b, which are formed by 1,650 d/3 rayon cords in a number of 34.8 cords/50 mm and coated with rubber, were inclined with respect to the circumferential direction by angles of 90° and 0°, respectively. The widths of the cord reinforced layers 16a and 16b were 110 mm and 116 mm, respectively and the thickness of these layers was 1 mm. Accordingly, the total thickness ($t$) of the crown portion was 5 mm in this embodiment. The space member 18 was made of a relatively hard rubber having a Shore A hardness of 63 which was used as a rubber for the tread portion of tire.

The tubeless tire and the bead stopper were combined with a 5J-rim and then each of the space portions E$a$ and E$b$ are subjected to internal pressures through the common valve 31 shown in FIG. 1.

In this case, it is preferable that the internal pressure of the space portion E$b$ is slightly higher than that of the space portion E$a$. Because, if the latter pressure is higher than the former pressure, the bead stopper is compressed by the internal pressure of the space portion E$a$ and cannot be maintained at the given shape.

When both the space portions are subjected to the internal pressure at 1.7 Kg/cm², the crown portion 12 was flat and the height (H) from the bead seats 22 to the crown portion 12 and the height (h) from the bead seats 22 to the flanges 23 were 40 mm and 16.8 mm, respectively. That is, the bead stopper was positioned upwardly from the flanges 23 by the distance of 23.2 mm.

The following comparative experiments were made with respect to the pneumatic tired wheel according to the present invention comprising the reinforced tubeless tire, the bead stoppper and the 5J-rim (hereinafter called to an assembly A) and a pneumatic tired wheel for comparison wherein the elastic reinforcements are not applied to the side portions of the tubeless tire (hereinafter called to an assembly B).

Figure 5:
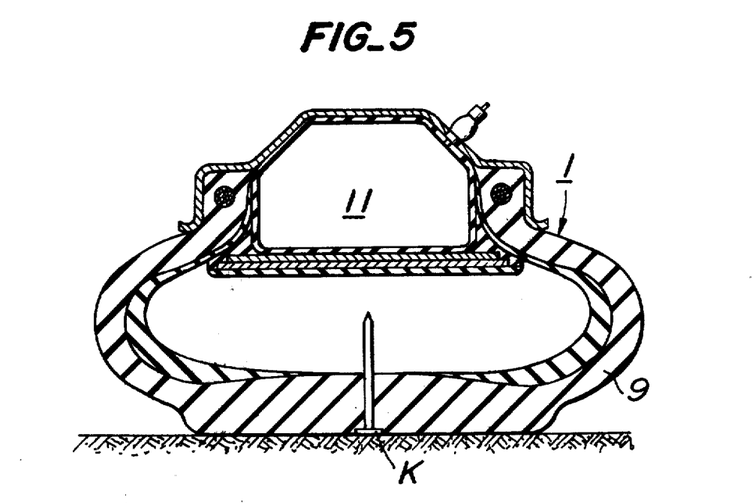
FIG. 5 is a cross-sectional view of the pneumatic tired wheel according to the present invention when it is punctured.

1. When the internal pressure of the tire was released by driving the nail of 30 mm length into the tread portion of the assembly A in a vertical direction and applying a static load of 400 Kg as shown in FIG. 5, the nail K did not reach the bead stopper. In this case, the internal pressure in the bead stopper was 1.7 Kg/cm².

Figure 6:
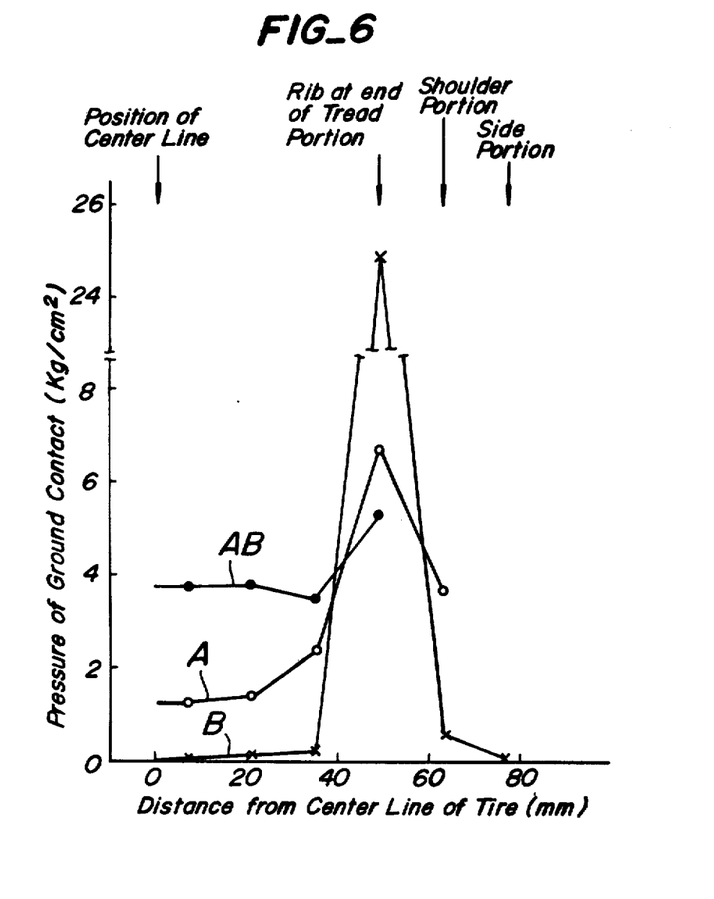
FIG. 6 is a graph showing pressure distribution of ground contact of the tire.

2. The pressure distribution of ground contact in the width direction of the tread portion under load was measured with respect to the assemblies A and B, when they are subjected to the internal pressure at 1.7 Kg/cm², respectively, or when the internal pressure was released, to obtain results as shown in FIG. 6. In this case, the static load was 400 Kg.

When the assemblies A and B are subjected to the internal pressures, respectively, there was substantially no difference between both the assemblies in the pressure distribution of ground contact, so that such a pressure distribution was shown by AB in FIG. 6.

Regarding the assembly A in the released state of the internal pressure, it can be seen from FIG. 6 that the value of the pressure of ground contact at the central part of the tread portion decreases to about ⅓, but such a decrease of the pressure of ground contact is supplemented by contacting ground with the shoulder portion which does not contact with ground when it is subjected to the internal pressure.

On the contrary, the assembly B showed that when the internal pressure is released, the pressure concentrates only to the rib at the end of the tread portion and the side portions of the tire are completely buckled and as a result, the load is born only by the shoulder portion just below the flange. This fact has a serious influence on the cornering performance as will be mentioned below.

3. Under the above described item (2), the cornering power (indication of cornering performance) was measured when the tire is subjected to the internal pressure or when the internal pressure becomes zero assuming the puncture. As a result, the cornering power of the assembly A is superior by 10 percent to that of the assembly B when it is subjected to the internal pressure. At the internal pressure of zero, the assembly B did not produce the cornering power due to the fact that the bead portion is removed from the rim into the concave part thereof, while the assembly A still possessed 45 percent of the cornering power when it is subjected to the internal pressure.

4. The running test under the punctured condition was made with respect to the assemblies A and B using a passenger car wherein only the internal pressure of the tire at the right front wheel was zero. The car was run at a speed of 80 Km/h in a circuit course. As a result, the assembly A showed no change of tire even after the continuous running of 200 Km, while the assembly B showed that the bead portion is removed from the rim into the concave part thereof immediately after the start of running and the tire is broken only at the distance of 2 Km as the running was further continued.

Even if the pneumatic tired wheel according to the present invention is punctured during the running and the internal pressure becomes zero, the bead portion is not removed from the rim into the concave part thereof and also the rigidity of the side portion of the tire is effectively increased by the cooperation of the elastic reinforcements arranged at the side portions with the side portions of the tire and the bead stopper, so that the buckling due to the formation of wrinkles at the side portions is prevented. Thus, the increase of abnormal generation of heat is previously prevented even if the running is further continued. Furthermore, the area of ground contact serving effectively for the running is not decreased, so that the automobile vehicle after the puncture can be safely run up to a repair shop or a safety place of replacing the tire. This fact is an unexpected improvement of the conventional tires.

What is claimed is:

1. In a pneumatic tired wheel including a tubeless tire having a relatively thick tread portion, a pair of side portions extending from said tread portion, a pair of bead portions extending from said side portions, a carcass embedded in said side portions across said bead portions, said bead portions being stiffened with at least one additional reinforcing layer disposed therein, an elastic bead stopper having an independent and airtight chamber inscribed within said bead portions, a rim having a pair of flanges; the improvements comprising a pair of elastic reinforcements having a Shore A hardness of at least 47 and extending along said side portions and formed integral therewith, the thickness of said elastic reinforcements gradually decreasing toward their associated bead portions and toward the center of said tread portion, with the maximum thickness adjacent said side portions being from 3 to 15 percent of the maximum width of the tire when it is inflated, and each end portion of said elastic reinforcements overlapping said additional reinforcing layer in said bead portion and the thickened tread portion, thereby to supplement the thickness of said side portions and to enhance the inherent rigidity thereof so as to support a load even under a punctured condition, said bead stopper having a crown portion which is substantially flat in cross section and comprises at least one inextensible cord layer forming an angle of cords of not more than 20° with respect to the circumferential direction, a pair of relatively thin and extensible side portions associated with the end portions of said crown portion comprised substantially of rubber material only and a pair of space members comprising a given volume of rubber having a Shore A hardness of at least 55 and arranged between each end of said cord layer in end portions of said crown portion and its associated side portion of the bead stopper, the outer diameter of said crown portion being larger than the outer diameter of said rim flanges but small enough to keep said crown portion within a defined space between said bead portions of the tire, thereby each of said bead portions is locked tightly in place between each side portion of said bead stopper and each of said rim flanges.

2. A pneumatic tired wheel as claimed in claim 1, wherein each of said elastic reinforcements has a maximum thickness within a range of 3 to 8 percent of the maximum width of the tire when it is inflated and a Shore A hardness of 63 to 94 .

3. A pneumatic tired wheel as claimed in claim 1, wherein said crown portion includes two rubber coated reinforcing layers of inextensible cords crossing each other at an angle of not more than 20° with respect to the circumferential direction and extending substantially over the width of said crown portion.

4. A pneumatic tired wheel as claimed in claim 1, wherein said crown portion includes two rubber coated reinforcing layers of inextensible cords crossing each other at angles of 0° to 90° with respect to the circumferential direction, respectively, and extending substantially over the width of said crown portion.

5. A pneumatic tired wheel as claimed in claim 1, wherein said inextensible reinforcing layer in the crown portion of the bead stopper is made of a cord selected from the group consisting of a metal, glass and organic fibers such as rayon fiber, polyester fiber, nylon fiber, vinylon fiber, aromatic polyamide fiber and the like.

6. A pneumatic tired wheel as claimed in claim 5, wherein rayon cord is used as said reinforcing cord for the crown portion of the bead stopper.

7. A pneumatic tired wheel as claimed in claim 1, wherein said tire comprises a pair of round shoulders formed at end portions of said tread portion, a carcass having at least one inextensible cord layer inclined with respect to a center line of the tire by an angle of 90° and a breaker disposed as a belt means outside said carcass in said tread portion, and each end portion of said elastic reinforcements directed in the center of the tread portion is overlapped with said breaker.

8. A pneumatic tired wheel as claimed in claim 1, wherein said side portions of said bead stopper are composed of rubber material only.

9. A pneumatic tired wheel as claimed in claim 8, wherein the inner circumferential end of said space members is substantially near the level of the outer circumferential end of said flanges when the tubeless tire and the bead stopper are combined with the rim.

10. A pneumatic tired wheel as claimed in claim 1, wherein said bead stopper is provided with a common valve for applying the internal pressure to the space portion of both the bead stopper and the tire, and at least one air channel communicating said valve with the space portion of the tire is formed in the side portion of the bead stopper by molding.

11. A pneumatic tired wheel as claimed in claim 1, wherein each of said elastic reinforcements is arranged between the inner liner and a carcass inside the tire.

12. A pneumatic tired wheel as claimed in claim 1, wherein one end of said elastic reinforcements extends substantially up to the ends of the bead portions and the other ends thereof are joined together at the center position of the tread portion.

13. A pneumatic tired wheel as claimed in claim 1, wherein each of said elastic reinforcements is arranged between the inner liner and a carcass inside the tire.

14. A pneumatic tired wheel as claimed in claim 1, wherein each of said elastic reinforcements is arranged between the plies of carcass.

15. A pneumatic tired wheel as claimed in claim 1, wherein each of said elastic reinforcements is arranged between a carcass and the outer rubber layer.

16. A pneumatic tired wheel as claimed in claim 1, wherein each of said elastic reinforcements has a maximum thickness at a position of the side portions of the tire near the tread portion.

17. A pneumatic tired wheel as claimed in claim 1, wherein the position of maximum thickness in each said elastic reinforcement is located at a substantially central position on the side portion of the tire having a thinnest gauge.

18. A pneumatic tired wheel as claimed in claim 1, wherein said cord layer for the elastic reinforcements is made of a material selected from the group consisting of a metal, glass and organic fibers such as nylon fiber, rayon fiber, polyester fiber, aromatic polyamide fiber and the like.

19. A pneumatic tired wheel as claimed in claim 2, wherein the portions of said bead stopper inclusive of said side portions which are held in contact with said bead portions of the tire and said rim are composed of rubber material only and a space member comprising a given volume of rubber having a Shore A hardness of at least 55 is arranged between one end of said at least one reinforcing layer and said portion of the bead stopper.

* * * * *